United States Patent [19]

Streimer et al.

[11] Patent Number: 5,265,344
[45] Date of Patent: Nov. 30, 1993

[54] RELATIVE MOTION PINWHEEL

[75] Inventors: Gary E. Streimer, Mystic; Leslie P. Benda, New London, both of Conn.

[73] Assignee: The United States of America as represented by the Secretary of the Navy, Washington, D.C.

[21] Appl. No.: 956,327

[22] Filed: Oct. 5, 1992

[51] Int. Cl.$^5$ ............................................. G01C 21/20
[52] U.S. Cl. ................................. 33/1 SB; 33/1 SD; 33/562; 33/431
[58] Field of Search ................. 33/1 SB, 1 B, 1 BB, 33/1 SD, 562, 430, 431; 235/61 NV

[56] References Cited

U.S. PATENT DOCUMENTS

| | | | |
|---|---|---|---|
| 2,339,516 | 1/1944 | Quillen | 33/431 |
| 4,095,342 | 6/1978 | Oertle | 33/1 SD |
| 4,637,143 | 1/1987 | Telles | 33/1 SB |

FOREIGN PATENT DOCUMENTS 560706  4/1944  United Kingdom ................. 33/431

Primary Examiner—William A. Cuchlinski, Jr.
Assistant Examiner—C. W. Fulton
Attorney, Agent, or Firm—Michael J. McGowan; Prithvi C. Lall; Michael F. Oglo

[57] ABSTRACT

An apparatus for visualizing relative motion between two moving objects in a two-dimensional plane is provided. A planar base has a first compass rose printed thereon. Rotatably attached to the center of the first compass rose is a means for indicating a present course of a first moving object relative to a true bearing indication on the first compass rose. A second moving object assembly consists of a second compass rose rotatably attached to a means for indicating a present course of the second moving object relative to a true bearing indication on the second compass rose. The true bearing indication on the second compass rose is aligned to be equivalent to the true bearing indication on the first compass rose. Attached at the centers of the first and second compass roses is a means for tethering the second moving object assembly to the first compass rose. The second compass rose is free to rotate about its center and the second moving object assembly is free to revolve in a single plane around the center of the first compass rose. The tethering means indicates a line of relative bearing from the first moving object to the second moving object.

7 Claims, 2 Drawing Sheets

RELATIVE MOTION PINWHEEL

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to navigational teaching devices, and more particularly to a relative motion pinwheel used as an aid to visualizing relative motion between two moving objects at a given point in time.

(2) Description of the Prior Art

Previously, estimated position and relative motion between two moving objects (e.g. two ships: own ship and a distant contact) was demonstrated by use of hands/fingers with verbal input to describe direction and movement between the objects. This method is imprecise and does not provide any means of communicating this information to anyone who is out of visual contact with the demonstrator. Furthermore, this method does not provide a systematic approach to understanding the concept of relative motion and is therefore not a reliable method of teaching this concept.

SUMMARY OF THE INVENTION

Accordingly, it is an object of the present invention to provide an apparatus that aids in visualizing relative motion between two moving objects.

Another object of the present invention is to provide an apparatus that can be operated systematically to visualize relative motion between two moving objects.

Yet another object of the present invention is to provide an apparatus that aids in visualizing relative motion between two moving objects whose operation is simple.

Still another object of the present invention is to provide a simply designed and easily manufactured apparatus that aids in visualizing relative motion between two moving objects.

Other objects and advantages of the present invention will become more obvious hereinafter in the specification and drawings.

In accordance with the present invention, an apparatus for visualizing relative motion between two moving objects in a two-dimensional plane is provided. A planar base has a first compass rose with a center printed thereon. Rotatably attached to the center of the first compass rose is a means for indicating a present course of a first moving object relative to a true bearing indicated on the first compass rose. A second compass rose having a center indicates a position of a second moving object. Rotatably attached to the center of the second compass rose is a means for indicating a present course of the second moving object relative to a true bearing indicated on the second compass rose. The true bearing indicated on the second compass rose is aligned to be equivalent to the true bearing indicated on the first compass rose. The second compass rose combined with the present course indicating means form a second moving object assembly. Attached at the centers of the first and second compass roses is a means for tethering the second moving object assembly to the first compass rose. Attachment is made such that the second compass rose is free to rotate about its center and the second moving object assembly is free to revolve in a single plane around the center of the first compass rose. The tethering means further indicates a line of relative bearing from the first moving object to the second moving object.

BRIEF DESCRIPTION OF THE DRAWING(S)

Other objects, features and advantages of the present invention will become apparent upon reference to the following description of the preferred embodiments and to the drawings, wherein:

FIG. 1 is a plan view of the relative motion pinwheel according to a preferred embodiment of the present invention; and FIG. 2 is an exploded view of the relative motion pinwheel illustrated in FIG. 1.

DESCRIPTION OF THE PREFERRED EMBODIMENT(S)

Figure 1:
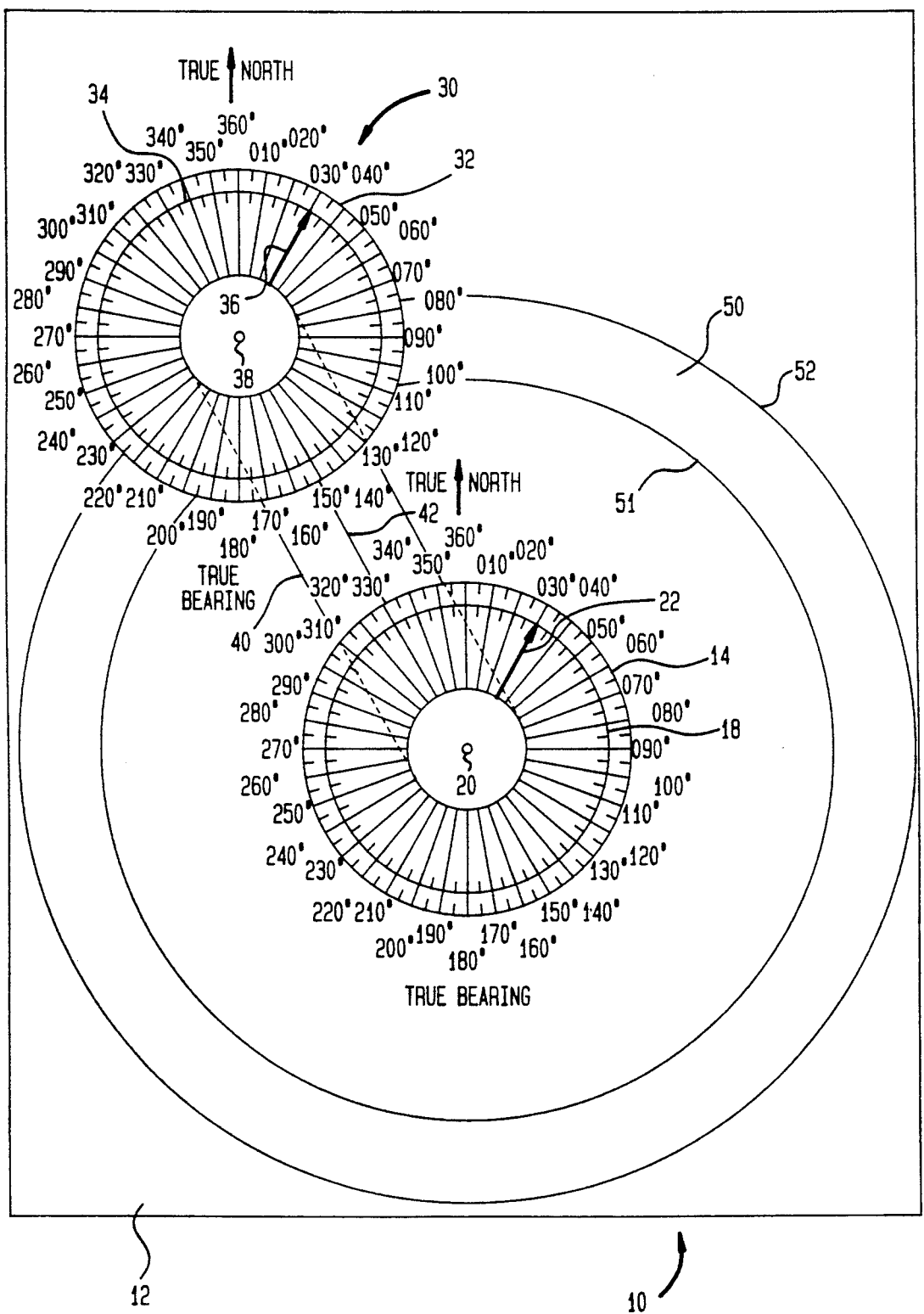
Figure 2:
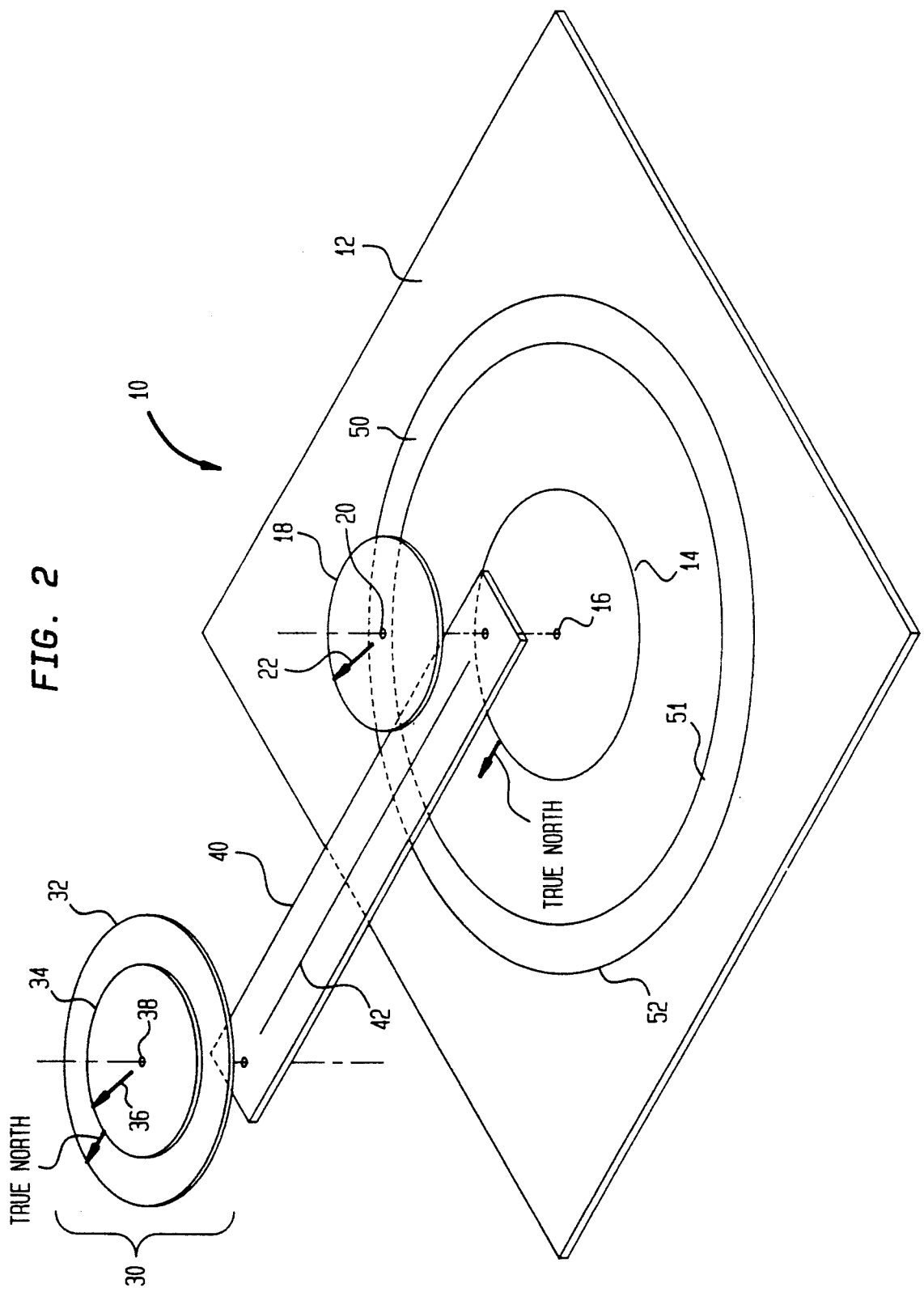

Referring now to the drawings, a plan view of the preferred embodiment is shown in FIG. 1 and an exploded view of the preferred embodiment is shown in FIG. 2. Simultaneous reference will be made to these drawings where common reference numerals have been used for common elements.

The relative motion pinwheel 10 according to the present invention is constructed on a base 12 having a compass rose 14 printed thereon. By way of example, base 12 is constructed from a relatively stiff sheet of preferably opaque cardboard or plastic. Compass rose 14 has one TRUE BEARING indicator which is typically chosen as TRUE NORTH. Compass rose 14 further has degree lines and designations printed thereabout. As shown, degree lines are provided every 5° and degree designations are provided every 10°. A greater or less amount of detail may be provided on compass rose 14 as needed.

A pinwheel 18 having a center 20 is attached to base 12 at the center 16 of compass rose 14. Attachment is made by any conventional means (not shown) that provides for 360° of rotation of pinwheel 18 with respect to compass rose 14. Printed on pinwheel 18 is a present course arrow 22 and lines spaced 10° apart that are annotated to represent relative bearing positions from center 20. Pinwheel 18 may be constructed from the same material as base 12.

A remotely located, freely rotating assembly 30 is also provided. Assembly 30 consists of a compass rose 32 and a pinwheel 34. Compass rose 32 is imprinted with degree lines and designations in a similar fashion as compass rose 14. Pinwheel 34 further has a present course arrow 36 painted thereon that is analogous to present course arrow 22, and lines spaced 10° apart that are annotated to represent relative bearing positions from center 38. Compass rose 32 and pinwheel 34 are attached to one another at a common center 38. Rotating assembly 30 is further attached to a strip 40 at common center 38. Attachment of compass rose 32, pinwheel 34 and strip 40 is made by any conventional means (not shown) that provides for 360° of rotation between each of these three elements. Strip 40 is further (rotatably) attached to base 12 at the center 16 of compass rose 14 such that rotating assembly 30 can revolve around the compass rose 14. Strip 40 is imprinted with a centerline 42. As shown, strip 40 is sandwiched between pinwheel 18 and base 12 on one end and lies underneath rotating assembly 30. Compass rose 32, pinwheel 34 and strip 40 may be constructed from the same material as base 12.

In order to understand the operation of the present invention, it will be assumed that pinwheel 18 is indicative of one's own ship traveling on a known course and that pinwheel 34 is indicative of a distant contact vessel traveling at some known or estimated course. Use of the relative motion pinwheel 10 can be broken down into the following four step process:

1) The first step is to align present course arrow 22 on the own ship pinwheel 18 with the present course heading on one's own ship relative to the "TRUE BEARING" on compass rose 14.
2) The second step is to rotate strip 40 (while maintaining the position of own ship pinwheel 18 positioned in step 1) such that centerline 42 indicates the relative bearing of the contact (i.e. contact pinwheel 34) on compass rose 14 as seen from one's own ship.
3) The third step is to rotate compass rose 32 about common center 38 (while maintaining the position of the elements noted in steps 1 and 2) such that its TRUE BEARING is pointed in the same direction as the TRUE BEARING on compass rose 14. This situation is illustrated in FIG. 1.
4) The fourth step is to rotate contact pinwheel 34 (while maintaining the position of the elements noted in steps 1-3) in order to align present course arrow 36 with the known or estimated present course heading of the contact vessel relative to the TRUE BEARING on compass rose 32.

For the example shown in FIG. 1, one's own ship is on a present course of 30° relative to TRUE BEARING (TRUE NORTH as shown). The contact vessel is located at a relative bearing of approximately 330° from one's own ship and is traveling at a known or estimated course of 30° relative to TRUE BEARING. The relative motion pinwheel 10 configured as shown in FIG. 1 provides an instantaneous visualization of the relative motion between two objects for the given scenario. Thus, it is now easy to visualize how changes (e.g course changes) in the scenario will affect a current situation between the two objects.

The advantages of the present invention are numerous. The relative motion pinwheel is easily configured to allow even the inexperienced to visualize two-dimensional relative motion between two objects in a precise manner. The four step process of configuring the present invention is a simple systematic approach that may be quickly learned. The relative motion pinwheel is simple and inexpensive to construct and would therefore be readily available as a teaching and operational tool.

While the present invention has been described relative to a particular embodiment, it is not so limited. For example, base 12 may also have a sonar detection range annulus 50 printed thereon. This is of particular use if one's own ship has sensing capabilities that begin at a minimum range (as indicated by the inner portion 51 of annulus 50) and extend to a maximum range (as indicated by the outer portion 52 of annulus 50). Strip 40 is then dimensioned so that the common center 38 of rotating assembly 30 (being indicative of the contact vessel) would revolve within annulus 50. In this way, it would be readily apparent how a contact vessel course change or changing the course of one's own ship would impact the ability of one's own ship to detect the contact vessel.

Furthermore, although strip 40 is shown as lying underneath pinwheel 18 and rotating assembly 30, it will be readily apparent that strip 40 could lie o top of these elements provided that strip 40 was transparent where necessary so that a user could read the degree lines and designations on compass roses 14 and 32. In addition, all of the elements of the present invention may be laminated to protect them from moisture damage and to provide an erasable surface on which to make teaching or operational notes. In still another variation of embodiment, with the exception of an opaque base 12, relative motion pinwheel 10's other elements consisting of stylus arm 40, pinwheel 18, compass rose 32 and pinwheel 34 could be made of transparent material except for inscriptions thereon. In this variation of embodiment stylus arm 40 is sandwiched between compass rose 32 and pinwheel 34. The variation yield is an improved stiffness characteristic to relative motion pinwheel 10's configuration, and enables better interpretation of "closeness of registry" and "of registry" between degree lines. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for visualizing relative motion between two moving objects, comprising:
   a base having a first compass rose printed thereon, said first compass rose having a center;
   means, rotatably attached to the center of said first compass rose, for indicating a present course of a first moving object relative to a true bearing indicated on said first compass rose;
   a second compass rose having a center for indicating a position of a second moving object;
   means, rotatably attached to the center of said second compass rose, for indicating a present course of the second moving object relative to a true bearing indicated on said second compass- rose, wherein the true bearing indicated on said second compass rose is aligned to be equivalent to the true bearing indicated on said first compass rose; and
   means, attached at the centers of said first and second compass roses, for tethering said second compass rose to said first compass rose, wherein said second compass rose is free to rotate about its center and further revolve around the center of said first compass rose, said tethering means indicating a line of relative bearing from the first moving object to the second moving object.

2. An apparatus according to claim 1 wherein the first and second moving objects are waterborne objects, the first moving object being equipped with a ranging system having minimum and maximum ranges, said base further having an annulus printed thereon that is concentric with the center of said first compass rose to indicate an annular zone in the water bounded by the minimum and maximum ranges, said tethering means constraining said second compass rose to revolve within said annulus.

3. An apparatus for visualizing relative motion between two moving objects in a two-dimensional plane, comprising:
   a planar base having a first compass rose printed thereon, said first compass rose having a center;

means, rotatably attached to the center of said first compass rose, for indicating a present course of a first moving object relative to a true bearing indicated on said first compass rose;

a second compass rose having a center for indicating a position of a second moving object;

means, rotatably attached to the center of said second compass rose, for indicating a present course of the second moving object relative to a true bearing indicated on said second compass rose, wherein the true bearing indicated on said second compass rose is aligned to be equivalent to the true bearing indicated on said first compass rose, and wherein said second compass rose and said means for indicating a present course of the second moving object form a second moving object assembly; and means, attached at the centers of said first and second compass roses, for tethering said second moving object assembly to said first compass rose, wherein said second compass rose is free to rotate about its center and said second moving object assembly is free to revolve in a single plane around the center of said first compass rose, said tethering means indicating a line of relative bearing from the first moving object to the second moving object.

4. An apparatus according to claim 3 wherein the first and second moving objects are waterborne objects, the first moving object being equipped with a ranging system having minimum and maximum ranges, said base further having an annulus printed thereon that is concentric with the center of said first compass rose to indicate an annular zone in the water bounded by the minimum and maximum ranges, said tethering means constraining said second moving object assembly to revolve within said annulus.

5. An apparatus for modeling angular spatial relationships in respect to an own vessel's course and a contact vessel's course comprising:

a stylus arm formed of a material which is transparent except for the inscriptions thereon, said stylus arm having a reference line inscribed thereon aligned along its major axis, one end of said stylus arm constituting its own vessel's end and having a first pivot point adjacent thereto passing through the reference line, the other end of said stylus arm constituting its contacted vessel end and having a pivot point adjacent thereto passing through said reference line, said first end of said stylus arm being sandwiched between an underlying sheet having a compass rose inscribed thereon and a overlying first disk formed of a material which is transparent except for the inscriptions thereon, said underlying sheet having inscribed thereon an own vessel indicator with a relative bearing rose thereabout;

said one end of said stylus arm, said underlying sheet and said overlying first disk being pivotally pinned for mutual independent relative rotation about said first pivot point with the center of the compass rose inscribed on said underlying sheet and the center of the own ship relative bearing rose inscribed on said first disk coinciding with said first pivot point;

said other end of said stylus arm being sandwiched between respectively underlying and overlying second and third disk's each formed of a material which is transparent except for what is inscribed thereon, said underlying second disk having a compass rose inscribed thereon, said overlying third disk having a contacted vessel indicator with a relative bearing rose thereabout inscribed thereon; and said other end of said stylus arm, said underlying second disk and said overlying third disk being pivotally pinned for mutual relative rotation about said second pivot point with the center of the compass rose inscribed on said second disk and the center of relative bearing rose inscribed on said third disk coinciding with said second pivot point;

whereby upon (i) alignment of the own vessel indicator inscribed on said first disk to the own vessel's true bearing on the compass rose inscribed on said underlying sheet, (ii) alignment of the reference line on the stylus arm to the relative bearing of the contacted vessel with respect to own vessel, (iii) alignment of the true north angular position of the compass rose inscribed on said second disk in parallel relationship to the true north angular position of the compass rose inscribed on said underlying sheet and (iv) alignment of the contacted vessel indicator inscribed on said third disk with a given true bearing of the contacted vessels course on the compass rose inscribed on said second disk, the own vessels indicator inscribed on said first disk and the contact vessel indicator inscribed on said third disk will model the relative angular between own vessel and contacted vessel when the latter is following a given true bearing course.

6. An apparatus according to claim 5 wherein said underlying sheet being formed of material which is opaque and constituting a base for the apparatus.

7. An apparatus according to claim 6 wherein the apparatus is of special utility in modeling angular motion in which contact with the contacted vessel would be based upon a sensing system having minimum and maximum ranges, wherein:

said sheet underlying said one end of the stylus arm having inscribed thereon an annual zone concentric with said first pivot point representing the fact that any contacted vessel would spatially be within an annular zone of the sea bounded by said minimum and maximum ranges of the sensing system.

* * * * *